United States Patent
Wang et al.

(10) Patent No.: US 8,958,832 B2
(45) Date of Patent: Feb. 17, 2015

(54) SYSTEM AND METHOD FOR FILTERING LONG SHORT MESSAGE

(75) Inventors: Fei Wang, Shenzhen (CN); Wenfei Xiu, Shenzhen (CN); Gangfeng Xie, Shenzhen (CN); Yajun Feng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 518 days.

(21) Appl. No.: 13/257,943

(22) PCT Filed: Apr. 28, 2010

(86) PCT No.: PCT/CN2010/072295
§ 371 (c)(1),
(2), (4) Date: Feb. 16, 2012

(87) PCT Pub. No.: WO2011/026336
PCT Pub. Date: Mar. 10, 2011

(65) Prior Publication Data
US 2012/0142381 A1    Jun. 7, 2012

(30) Foreign Application Priority Data
Sep. 4, 2009 (CN) .......................... 2009 1 0092018

(51) Int. Cl.
*H04J 3/16* (2006.01)
*H04W 4/12* (2009.01)
(Continued)

(52) U.S. Cl.
CPC ............. *H04W 4/12* (2013.01); *H04L 63/0227* (2013.01); *H04W 12/12* (2013.01)
USPC .............................. 455/466; 455/403; 455/406

(58) Field of Classification Search
CPC ..... H04W 4/12; H04W 12/12; H04L 63/0227
USPC .......................................... 455/403, 466, 406
See application file for complete search history.

(56) References Cited

U.S. PATENT DOCUMENTS

| 6,597,918 | B1 | 7/2003 | Kim | |
|---|---|---|---|---|
| 2004/0203581 | A1* | 10/2004 | Sharon et al. | 455/406 |

(Continued)

FOREIGN PATENT DOCUMENTS

| CN | 101001413 A | 7/2007 |
|---|---|---|
| CN | 100450204 C | 1/2009 |
| CN | 101651934 A | 2/2010 |
| WO | 2004032451 A1 | 4/2004 |

OTHER PUBLICATIONS

Supplementary European Search Report in European application No. 10813258.0, mailed on May 8, 2012.
(Continued)

*Primary Examiner* — Shahriar Behnamian
(74) *Attorney, Agent, or Firm* — Oppedahl Patent Law Firm LLC

(57) ABSTRACT

The disclosure discloses a system and a method for filtering a long short-message, wherein the method comprises the following steps: step 1: a network security agent module sends a short message which is from a short message center and/or a short message gateway to a real-time monitoring service processing module (101), and the real-time monitoring service processing module sends split messages in the short message to a long message splicing module (102); step 2: the long message splicing module splices multiple split messages into an integrated long message and sends it to the real-time monitoring service processing module (103); step 3: the real-time monitoring service processing module filters the integrated long message according to a filter condition and returns a filter result to the network security agent module (104). The disclosure can filter out all key words in the long message effectively, so as to solve the problem in prior art that a long short-message that has been split up can not be filtered out effectively.

14 Claims, 4 Drawing Sheets

(51) Int. Cl.
*H04L 29/06* (2006.01)
*H04W 12/12* (2009.01)

(56) References Cited

U.S. PATENT DOCUMENTS

2007/0230506 A1* 10/2007 Zou ............................. 370/473
2008/0004048 A1* 1/2008 Cai et al. ....................... 455/466

OTHER PUBLICATIONS

International Search Report in international application No. PCT/CN2010/072295, mailed on Aug. 12, 2010.

English Translation of the Written Opinion of the International Search Authority in international application No. PCT/CN2010/072295, mailed on Aug. 12, 2010.

* cited by examiner

SYSTEM AND METHOD FOR FILTERING LONG SHORT MESSAGE

TECHNICAL FIELD

The disclosure relates to a short message service in the field of mobile communications, particularly to a system and method for filtering a long short message.

BACKGROUND

A short message, as a convenient and fast contact way, enjoys the popularity of more and more users in recent years and makes a rapid progress. But the same as an email, a mobile phone short message is increasingly troubled by a lot of spam messages. At present, there are more than 600 million mobile phone users in China, with up to 800 million short messages sent every day and 8 spam messages received by every user every week on an average. For a mobile user, a spam message not only seriously influences a normal life of the user but also harms the individual privacy; for operators, the overflow of spam messages causes a huge investment waste to the infrastructure, such as a short message center, and increases the danger of a network suffering from a malicious attack; therefore, the parties concerned are hustling to set up related laws and regulations, the operators also pay more and more attentions to spam messages and build spam message filtering systems to filter spam messages by technical means so as to create a continuous, sequential and healthy development environment for the development of a short message service (SMS).

Generally, the spam message filtering system filters messages in terms of such aspects as short message content, short message flow and user numbers; one of the basic filtering measures is to filter a short message by matching key words of short message content, for example, the short message content containing key words involving pornography, retroaction and other definitions can be directly filtered out by matching key words. At present, among short messages sent by users, a number of the short messages are long short-messages, wherein the long short-message is a short message with a character number exceeding a certain number (generally exceeding 70 Chinese characters or 160 English characters); the long short-message often may be split into multiple short messages when being sent. After the long short-message is split, the key words defined by the spam message filtering system may be partitioned into multiple short messages, however, the present spam message filtering system processes the long short-message by filtering the split messages respectively, therefore, the message content of the long short-message whose split part contains the key words can not be effectively filtered out.

SUMMARY

The purpose of the disclosure is to provide a system and method for filtering a long short-message, which can effectively filter out all the key words in the long message and solve the problem in the prior art that the long short-message which has been split up can not be effectively filtered out.

In order to achieve the above purpose, in one aspect, the disclosure provides a system for filtering a long short-message, which comprises a network security agent module, a real-time monitoring service processing module and a long message splicing module, wherein the network security agent module may be configured to send a short message which is from a short message center and/or a short message gateway to the real-time monitoring service processing module;

the real-time monitoring service processing module may be configured to send split messages in the short message to the long message splicing module, filter an integrated long message according to a filter condition and return a filter result to the network security agent module; and the long message splicing module may be configured to splice multiple split messages into the integrated long message and send it to the real-time monitoring service processing module.

Preferably, in the above system, there may be a plurality of real-time monitoring service processing modules; the network security agent module may be further configured to decode the short message which is from the short message center and/or the short message gateway, send the decoded short message to the plurality of real-time monitoring service processing modules according to mantissa of a user number and return the filter result to the short message center and/or the short message gateway.

Preferably, in the above system, the system may further comprise a filter condition setting module which is configured to set the filter condition and synchronously send the filter condition to the real-time monitoring service processing modules.

The disclosure also provides a method for filtering a long short-message, which comprises:

step 1: a network security agent module sends a short message which is from a short message center and/or a short message gateway to a real-time monitoring service processing module, and the real-time monitoring service processing module sends split messages in the short message to a long message splicing module;

step 2: the long message splicing module splices multiple split messages into an integrated long message and sends it to the real-time monitoring service processing module; and step 3: the real-time monitoring service processing module filters the integrated long message according to a filter condition, and returns a filter result to the network security agent module.

Preferably, in the above method, before the step 1, the method may further comprise: setting the filter condition and synchronously sending the filter condition to the real-time monitoring service processing modules;

after the step 3, the method may further comprise step 4: the network security agent module returns the filter result to the short message center and/or the short message gateway.

Preferably, in the above method, the step 1 may specifically comprise: the network security agent module decodes the short message which is from the short message center and/or the short message gateway, and sends the decoded short message to the real-time monitoring service processing modules; the real-time monitoring service processing module sends split messages in the decoded short message to the long message splicing module;

there may be a plurality of real-time monitoring service processing modules; in the step 1, the step that the network security agent module sends the decoded short message may specifically comprise: the network security agent module distributes the decoded short message to the plurality of real-time monitoring service processing modules according to mantissa of a user number.

Preferably, in the above method, the step 2 may specifically comprise: the long message splicing module caches the multiple split messages, if all the split messages belonging to a same long message are cached, then all the split messages belonging to the same long message are spliced into the integrated long message and the integrated long message is sent to the real-time monitoring service processing module.

Preferably, in the above method, the step 1 may further comprise: the real-time monitoring service processing module filters non-split messages in the decoded short message according to the filter condition and returns a filter result to the network security agent module, and then the step 4 is executed.

Preferably, in the above method, each split message may correspond to one session in the real-time monitoring service processing module; in the step 2, the step of sending the integrated long message to the real-time monitoring service processing module may specifically comprise: returning the integrated long message to a first session corresponding to a first split message of the integrated long message.

Preferably, in the above method, the step 3 may further comprise: the real-time monitoring service processing module returns the filter result to the long message splicing module, and the long message splicing module returns the filter result to sessions corresponding to all the split messages except the first split message belonging to the same integrated long message; and in the step 4, the step of returning the filter result to the short message center and/or the short message gateway may specifically comprise: returning the filer result to the short message center and/or the short message gateway as a filter result of all the split messages in the integrated long message.

The disclosure at least has the following technical effects: the system and method for filtering a short message in the disclosure can not only filter a common message according to a normal process, but also effectively filter out all the key words in the long message by adding the long short-message splicing module and the cooperation thereof with other modules; therefore, the problem in the present system that message content of the long short-message whose split part contains key words can not be effectively filtered out is solved.

DETAILED DESCRIPTION

For a better understanding of the purpose, technical scheme and advantages of the disclosure, specific embodiments are illustrated below in detail in conjunction with accompanying drawings.

A method for filtering a long short-message according to an embodiment of the disclosure comprises the following steps:

step 1: a network security agent module sends a short message which is from a short message center and/or a short message gateway to a real-time monitoring service processing module, and the real-time monitoring service processing module sends split messages in the short message to a long message splicing module;

step 2: the long message splicing module splices multiple split messages into an integrated long message and sends it to the real-time monitoring service processing module; and step 3: the real-time monitoring service processing module filters the integrated long message according to a filter condition, and returns a filter result to the network security agent module.

After the step 3, the method may further comprise step 4 that the network security agent module returns the filter result to the short message center and/or short message gateway.

Figure 1:
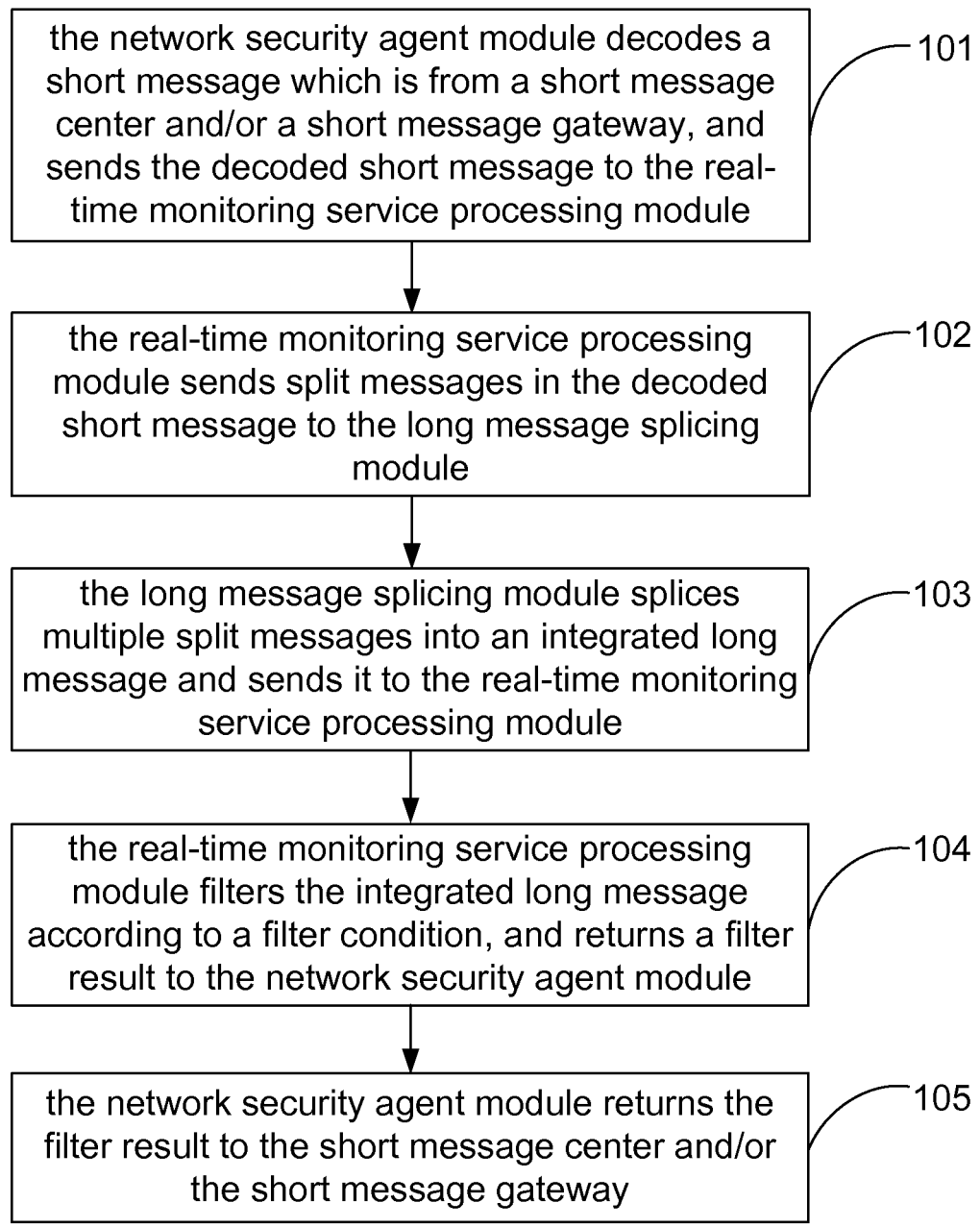
FIG. 1 shows a step flow chart of a method for filtering a long short-message according to the disclosure.

FIG. 1 shows a step flow chart of a method for filtering a long short-message according to the disclosure; as shown in FIG. 1, the method comprises the following steps:

step 101: the network security agent module decodes a short message which is from the short message center and/or short message gateway, and sends the decoded short message to the real-time monitoring service processing module;

step 102: the real-time monitoring service processing module sends split messages in the decoded short message to the long message splicing module;

step 103: the long message splicing module splices multiple split messages into an integrated long message and sends it to the real-time monitoring service processing module;

step 104: the real-time monitoring service processing module filters the integrated long message according to a filter condition, and returns a filter result to the network security agent module; and step 105: the network security agent module returns the filter result to the short message center and/or short message gateway.

Wherein the filter condition can be predetermined or can be changed, therefore, before the step 101, the method may further comprise a step that a filter condition setting module sets a filter condition and synchronously sends the filter condition to the real-time monitoring service processing module.

Figure 2:
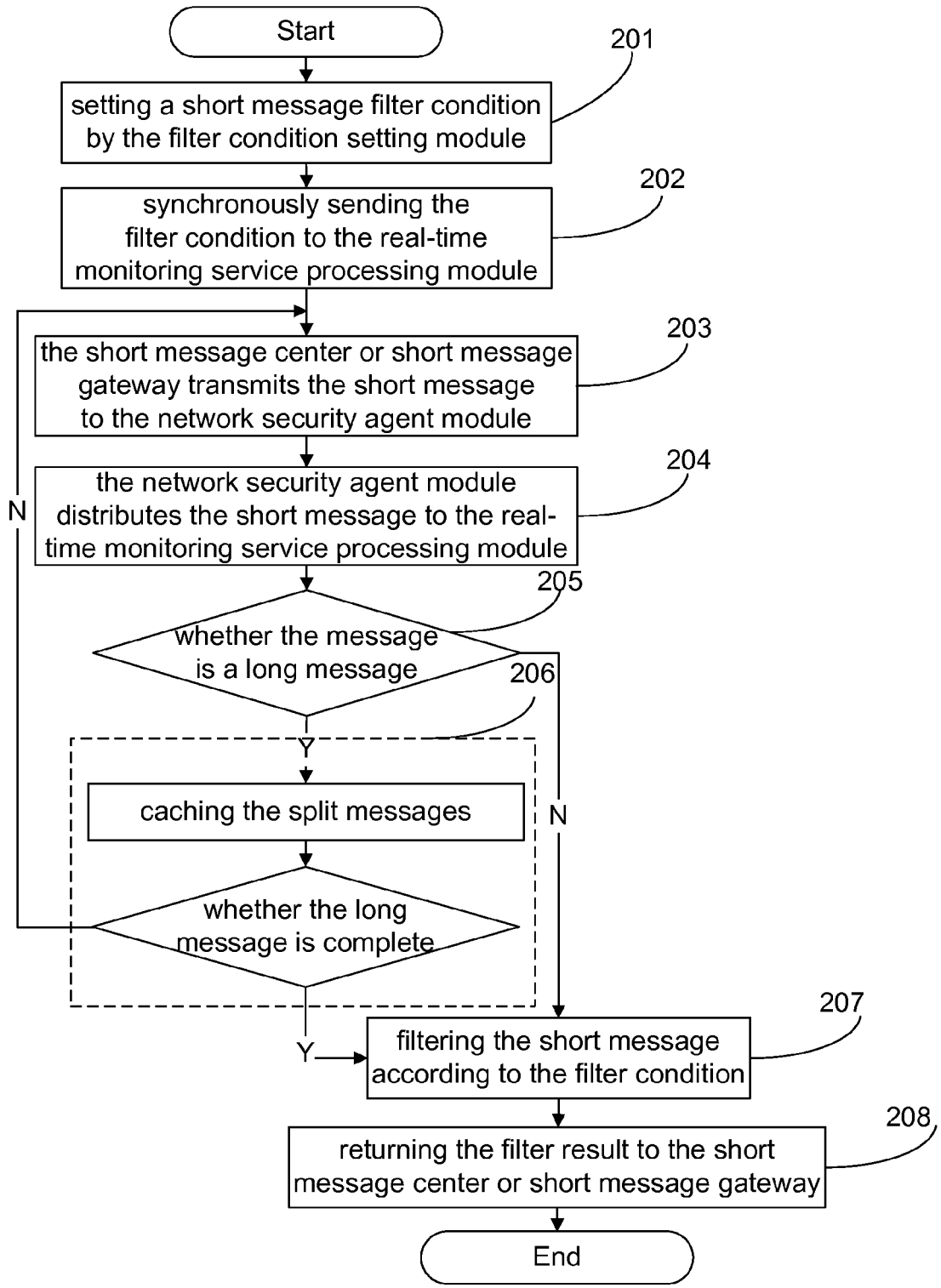
FIG. 2 shows a detailed flow chart of a short message filtering process according to the disclosure.

FIG. 2 shows a detailed flow chart of a short message filtering process in a short message filtering system, wherein the specific flow comprises the following steps:

step 201: a user sets a short message filter condition through the filter condition setting module;

here, the filter condition may comprise the setting of key words of short message content;

step 202: after setting the filter condition, the filter condition setting module synchronously sends the filter condition to a plurality of real-time monitoring service processing modules; in this way, the plurality of real-time monitoring service processing modules work in the same mode to share burden;

step 203: the short message center or short message gateway transmits a short message to the network security agent module;

step 204: the network security agent module decodes a message of a Short Message Peer to Peer (SMPP) protocol format, and distributes the decoded message to the real-time monitoring service processing module based on a modulo operation on mantissa of a user number;

step 205: the real-time monitoring service processing module determines whether the message is a long message according to the decoded message; if yes, step 206 is executed; otherwise, step 207 is executed;

step 206: the long message splicing module caches the long message which has been split up and determines whether all the split messages in the long message are received; if yes, all the split messages are spliced into an integrated long message and forwarded to the real-time monitoring service processing module, then step 207 is executed; otherwise, waiting for the cache of a next message is continued;

step 207: the real-time monitoring service processing module filters the message according to the filter condition and returns a filter result to the network security agent module; and step 208: the network security agent module finally returns the short message filter result to the short message center or short message gateway.

Figure 3:
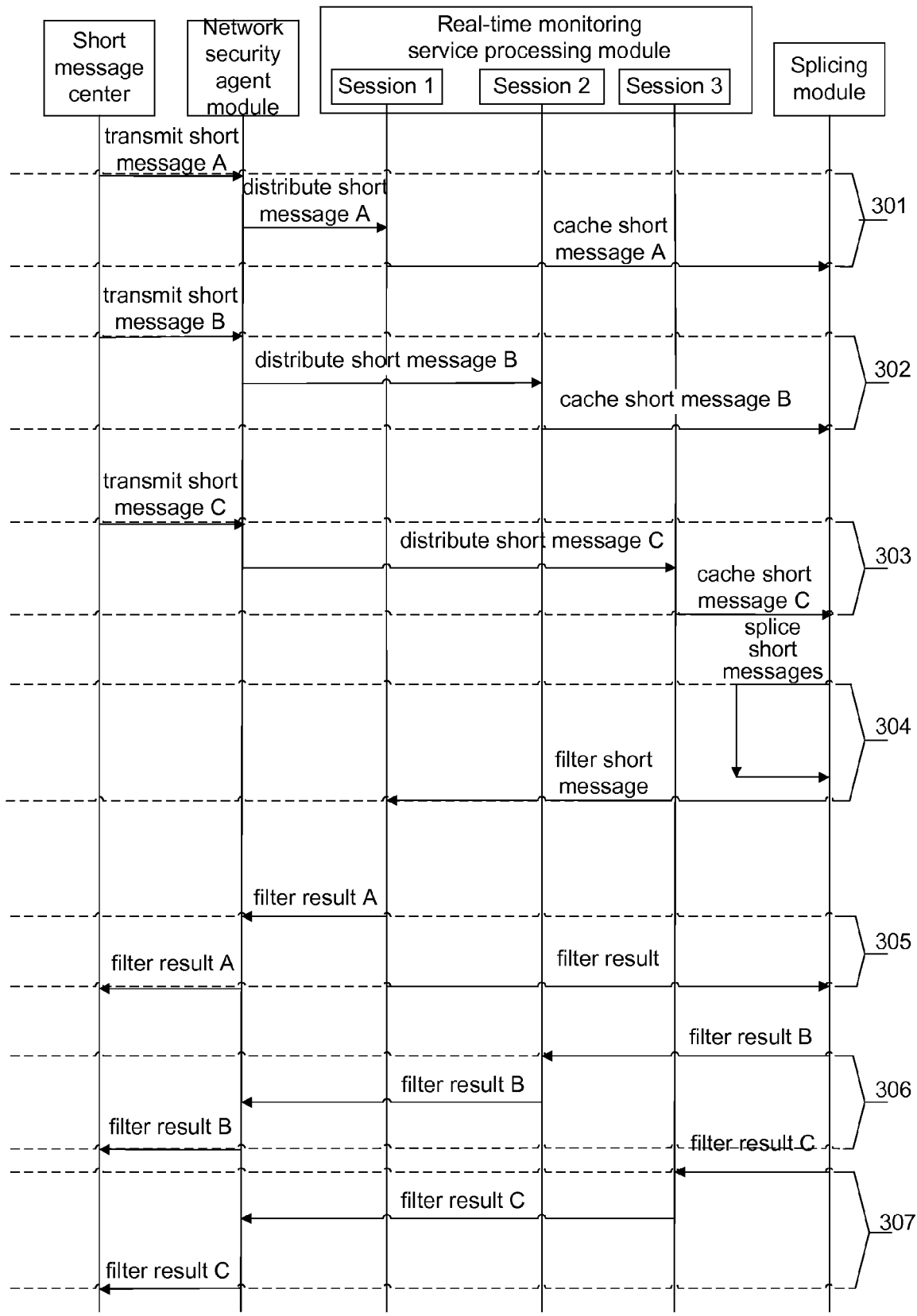
FIG. 3 shows a flow chart of the filtering interaction of a long short-message which is split into three short messages according to the disclosure.

Further, provided a long short-message is split into three short messages A, B and C, and then transmitted to the short message filtering system through the short message center; FIG. 3 describes the interaction between the long short-message filtering modules in detail, wherein the specific flow comprises the following steps:

step 301: the short message center transmits the short message A to the network security agent module which then distributes the short message A to the real-time monitoring service processing module; the real-time monitoring service processing module determines that the message A is a long message and applies for session 1, and then forwards the message A and session information to the long short-message splicing module; the long short-message splicing module obtains the unique identifier (reference id) of the long message to which the short message A belongs by analyzing the short message content; after the long message is split, there are totally 3 messages; the sequence number of the short message A in the long message is 1; then the message A and session 1 are stored in a hash list with (source number, destination number, reference id) as a key value;

step 302: the short message center transmits the short message B to the network security agent module which then distributes the short message B to the real-time monitoring service processing module; the real-time monitoring service processing module determines that the message B is a long message and applies for session 2, and then forwards the message B and session information to the long short-message splicing module; the long short-message splicing module obtains the identifier (reference id) of the long message to which the short message B belongs by analyzing the short message content; after the long message is split, there are totally 3 messages; the sequence number of the short message B in the long message is 2; then the message B and session 2 are stored in the hash list with (source number, destination number, reference id) as a key value;

step 303: the short message center transmits the short message C to the network security agent module which then distributes the short message C to the real-time monitoring service processing module; the real-time monitoring service processing module determines that the message C is a long message and applies for session 3, and then forwards the message C and session information to the long short-message splicing module; the long short-message splicing module obtains the identifier (reference id) of the long message to which the short message C belongs by analyzing the short message content; after the long message is split, there are totally 3 messages; the sequence number of the short message C in the long message is 3; then the message C and session 3 are stored in the hash list with (source number, destination number, reference id) as a key value;

step 304: the long short-message splicing module finds that the messages A, B and C with the same key value are received and the sequence numbers thereof are 1, 2, 3 respectively, and that the corresponding long message is split into 3 messages totally, then the long short-message splicing module obtains that an integrated long short-message is received, splices the messages A, B and C into an integrated long short-message and sends it to the session 1 in the real-time monitoring service processing module;

step 305: the session 1 in the real-time monitoring service processing module filters the long short-message to obtain a filter result, returns the filter result to the short message center through the network security agent module as a filter result of the short message A, and at the same time forwards the filter result to the long short-message splicing module;

step 306: after receiving the filter result, the long short-message splicing module returns the filter result to the session 2 in the real-time monitoring service processing module; then the session 2 returns the filter result to the short message center through the network security agent module as a filter result of the short message B; and step 307: at the same time, the long short-message splicing module returns the filter result to the session 3 in the real-time monitoring service processing module; then the session 3 returns the filter result to the short message center through the network security agent module as a filter result of the short message C.

Finally, the method not only realizes the effective monitoring of a long short-message but also obtains three consistent filter result responses. It should be noted that the transmit sequences of the three short messages transmitted by the short message center might have a change; however, the processing method above is still applicable.

It can be seen from the above that in the method provided by the disclosure, the network security agent module obtains a short message which is transmitted in real time and distributes the message to the real-time monitoring service processing module according to the mantissa of a user number after the short message is decoded by the SMPP; the real-time monitoring service processing module first analyzes whether the message is a long message according to decoding, if the message is not a long message, the message is authenticated according to a filter condition directly and a result is returned to the short message center or short message gateway through the network security agent module; if the message is a long message that has been split up, then a new session is applied for saving information related to the message, and the message and the session information are forwarded to the long short-message splicing module, in this way, the long message that has been split up may correspond to several sessions in the real-time monitoring service processing module; the long short-message splicing module caches the received message and session information, if it is found that all the messages split coming from the long short-message are received, then the messages are spliced into an integrated long message and sent to the first session of the real-time monitoring service processing module corresponding to the long message; the real-time monitoring service processing module authenticates the long message and simultaneously returns an authentication result to the network security agent module and the long short-message splicing module; after receiving the authentication result, the long short-message splicing module returns the authentication result to other sessions of the real-time monitoring service processing module corresponding to the long message respectively; finally, the other sessions also return the authentication result to the network security agent module. The method finally both realizes the effective filtering of a long short-message and guarantees that the short message center or short message gateway can obtain an authentication response to each split message.

Figure 4:
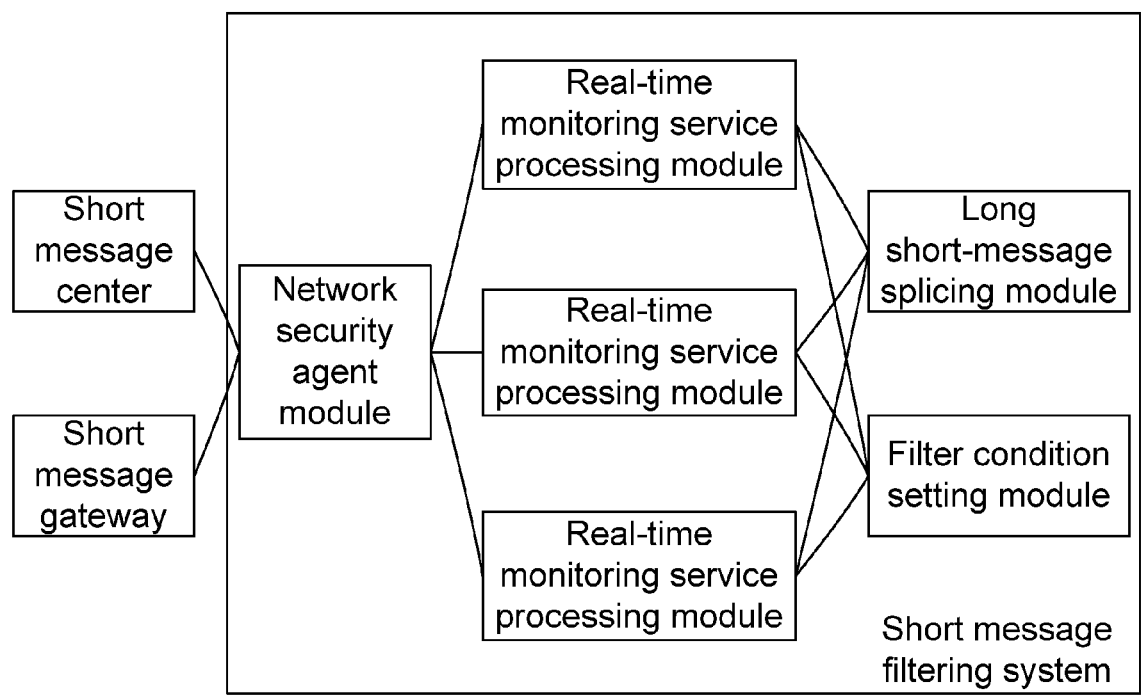
FIG. 4 shows a structural diagram of a short message filtering system according to the disclosure.

In order to filter a long short-message, an embodiment of the disclosure also provides a long short-message filtering system; FIG. 4 shows a structural diagram of a short message filtering system according to the disclosure, wherein the system comprises a network security agent module, a real-time monitoring service processing module and a long short-message splicing module, also may comprise a filter condition setting module.

The network security agent module is configured to make the system access one or more short message centers and short message gateways, receive a short message transmitted from the short message center and/or short message gateway, distribute the short message to the real-time monitoring service processing module and return a processing result of the real-time monitoring service processing module to the short message center and/or short message gateway.

The real-time monitoring service processing module is configured to authenticate the short message according to a short message filter condition; in order to meet requirements of multiple short message centers for receiving a large amount of services, the real-time monitoring service processing module may be deployed as a plurality of modules to share burden.

The long short-message splicing module is configured to cache and splice split messages and send a splicing result to the real-time monitoring service processing module.

The filter condition setting module is configured to save a configured filter condition and synchronously send the filter condition to the real-time monitoring service processing module, wherein the filter condition comprises the setting of key words of short message content.

All the inner modules of the system adopt a communication mechanism based on TCP/IP or inter-process to communicate. The network security agent module and short message center/short message gateway are connected through the SMPP protocol.

It can be seen from the above that the embodiments of the disclosure has the following advantages:

the system and method for filtering a short message in the disclosure not only can filter a common message according to a normal process, but also effectively filter out all the key words in a long message by adding a long short-message splicing module and the cooperation thereof with other modules; therefore, the defect in the present system that the message content of a long short-message whose split part contains key words can not be effectively filtered out is solved.

The above are only the preferable embodiments of the disclosure; it should be pointed that, for those skilled in the art, various improvements or modifications can be made to the disclosure without departing from the principle of the disclosure. These improvements or modifications should be deemed to be included within the protection scope of the disclosure.

What is claimed is:

1. A system for filtering out a key word in a long short-message, comprising a short message center and/or a short message gateway, a network security agent module, a real-time monitoring service processing module and a long message splicing module, wherein
    the short message center and/or a short message gateway is configured to receive a long short-message from a user, split the long short-message into a plurality of split messages, and send the plurality of split messages to the network security agent module;
    the network security agent module is configured to decode the plurality of split messages, send the plurality of decoded split messages to the real-time monitoring service processing module;
    the real-time monitoring service processing module is configured to send the plurality of decoded split messages to the long message splicing module; and
    the long message splicing module is configured to splice the plurality of decoded split messages into an integrated long message and send the integrated long message to the real-time monitoring service processing module; and
    wherein the real-time monitoring service processing module is further configured to filter the integrated long message according to a filter condition of matching a key word of the integrated long message content and return a filter result to the network security agent module.

2. The system according to claim 1, wherein there are a plurality of real-time monitoring service processing modules; the network security agent module is further configured to send the plurality of decoded split messages to one of the plurality of real-time monitoring service processing modules according to mantissa of a user number, and return the filter result to the short message center and/or the short message gateway.

3. The system according to claim 2, further comprising a filter condition setting module which is configured to set the filter condition and synchronously send the filter condition to the real-time monitoring service processing modules.

4. The system according to claim 1, further comprising a filter condition setting module which is configured to set the filter condition and synchronously send the filter condition to the real-time monitoring service processing modules.

5. A method for filtering out a key word in a long short-message, comprising:
    step 1: receiving, by a short message center and/or a short message gateway, a long short-message from a user, and splitting the long short-message into a plurality of split messages, and sending the plurality of split messages to a network security agent module; decoding, by the network security agent module, the plurality of split messages, and sending the plurality of decoded split messages to a real-time monitoring service processing module; and sending, by the real-time monitoring service processing module, the plurality of decoded split messages to a long message splicing module;
    step 2: splicing, by the long message splicing module, the plurality of decoded split messages into an integrated long message, and sending the integrated long message to the real-time monitoring service processing module;
    step 3: filtering, by the real-time monitoring service processing module, the integrated long message according to a filter condition of matching a key word of the integrated long message content and returning a filter result to the network security agent module.

6. The method according to claim 5, further comprising: before the step 1, setting the filter condition and synchronously sending the filter condition to the real-time monitoring service processing modules; and
    step 4: after the step 3, returning the filter result to the short message center and/or the short message gateway by the network security agent module.

7. The method according to claim 6, wherein
    there are a plurality of real-time monitoring service processing modules; and the step of sending, by the network security agent module, the plurality of decoded split messages specifically comprises: distributing, by the network security agent module, the plurality of decoded split messages to one of the plurality of real-time monitoring service processing modules according to mantissa of a user number.

8. The method according to claim 7, wherein the step 2 specifically comprises: caching, by the long short-message splicing module, the plurality of decoded split messages, if all of the plurality of decoded split messages belonging to a same long short-message are cached, then splicing all of plurality of the decoded split messages belonging to the same long short-message into the integrated long message and sending the integrated long message to the one of the plurality of real-time monitoring service processing modules.

9. The method according to claim 7, wherein there are sessions in the real-time monitoring service processing module, and each of the plurality of decoded split messages corresponds to one session;

in the step 2, the step of sending the integrated long message to the real-time monitoring service processing module specifically comprises: returning the integrated long message to a first session corresponding to a first split message of the integrated long message.

10. The method according to claim 9, wherein the step 3 further comprises: returning, by the real-time monitoring service processing module, the filter result to the long message splicing module; returning, by the long message splicing module, the filter result to other sessions except the first session corresponding to other split messages of the integrated long message in the real-time monitoring service processing module; and in the step 4, the step of returning the filter result to the short message center and/or the short message gateway specifically comprises: returning the filer result to the short message center and/or the short message gateway as a filter result of all the split messages in the integrated long message.

11. The method according to claim 5, wherein there are a plurality of real-time monitoring service processing modules; and the step of sending, by the network security agent module, the plurality of decoded split messages specifically comprises: distributing, by the network security agent module, the plurality of decoded split messages to one of the plurality of real-time monitoring service processing modules according to mantissa of a user number.

12. The method according to claim 11, wherein the step 2 specifically comprises: caching, by the long short-message splicing module, the plurality of decoded split messages, if all of the plurality of decoded split messages belonging to a same long short-message are cached, then splicing all of the plurality of decoded split messages belonging to the same long short-message into the integrated long message and sending the integrated long message to the one of the plurality of real-time monitoring service processing modules.

13. The method according to claim 11, wherein there are sessions in the real-time monitoring service processing module, and each of the plurality of decoded split messages corresponds to one session;

in the step 2, the step of sending the integrated long message to the real-time monitoring service processing module specifically comprises: returning the integrated long message to a first session corresponding to a first split message of the integrated long message.

14. The method according to claim 13, wherein the step 3 further comprises: returning, by the real-time monitoring service processing module, the filter result to the long message splicing module; returning, by the long message splicing module, the filter result to other sessions except the first session corresponding to other split messages of the integrated long message in the real-time monitoring service processing module; and in the step 4, the step of returning the filter result to the short message center and/or the short message gateway specifically comprises: returning the filer result to the short message center and/or the short message gateway as a filter result of all the split messages in the integrated long message.

* * * * *